United States Patent [19]

Bassett

[11] Patent Number: 5,709,271

[45] Date of Patent: *Jan. 20, 1998

[54] AGRICULTURAL PLANTER

[75] Inventor: James H. Bassett, Sycamore, Ill.

[73] Assignee: Dawn Equipment Company, Sycamore, Ill.

[*] Notice: The term of this patent shall not extend beyond the expiration date of Pat. No. 5,479,992.

[21] Appl. No.: 531,899

[22] Filed: Sep. 22, 1995

Related U.S. Application Data

[63] Continuation-in-part of Ser. No. 367,990, Jan. 3, 1995, which is a continuation-in-part of Ser. No. 73,573, Jun. 8, 1993, Ser. No. 97,977, Jul. 27, 1993, Pat. No. 5,499,683, Ser. No. 97,978, Jul. 27, 1993, Pat. No. 5,479,992, and Ser. No. 189,840, Feb. 1, 1994, abandoned.

[51] Int. Cl.$^6$ .............. A01C 5/00; A01B 63/00
[52] U.S. Cl. .............. 172/4; 172/239; 111/134; 111/63; 111/200; 73/84
[58] Field of Search .............. 172/76, 2, 3, 4, 172/4.5, 7, 9, 10, 239; 111/62, 63, 134, 200; 73/84; 56/10.2 E, 10.2 D, 10.2 F

[56] References Cited

U.S. PATENT DOCUMENTS

| | | |
|---|---|---|
| 1,247,744 | 11/1917 | Trimble . |
| 2,014,334 | 4/1935 | Johnson . |
| 2,593,176 | 4/1952 | Patterson . |
| 2,611,306 | 9/1952 | Strehlow et al. . |
| 2,715,286 | 8/1955 | Saveson . |
| 2,799,234 | 7/1957 | Chancey . |
| 3,042,121 | 7/1962 | Broetzman et al. . |
| 3,057,092 | 10/1962 | Curlett . |
| 3,065,879 | 11/1962 | Jennings et al. . |
| 3,110,973 | 11/1963 | Reynolds . |
| 3,123,152 | 3/1964 | Biskis . |
| 3,479,035 | 11/1969 | Cayton et al. . |
| 3,653,446 | 4/1972 | Kalmon .............. 172/4 |
| 3,975,890 | 8/1976 | Rodger .............. 56/10.2 E X |
| 4,044,697 | 8/1977 | Swanson . |
| 4,141,200 | 2/1979 | Johnson .............. 56/10.2 E |
| 4,142,589 | 3/1979 | Schlagenhauf . |
| 4,173,259 | 11/1979 | Heckenkamp .............. 172/10 |
| 4,182,099 | 1/1980 | Davis et al. . |
| 4,196,567 | 4/1980 | Davis et al. . |
| 4,196,917 | 4/1980 | Oakes et al. . |
| 4,233,803 | 11/1980 | Davis et al. . |
| 4,241,674 | 12/1980 | Mellinger . |
| 4,280,419 | 7/1981 | Fischer . |
| 4,301,870 | 11/1981 | Carre et al. .............. 172/7 |

(List continued on next page.)

FOREIGN PATENT DOCUMENTS

| | | |
|---|---|---|
| 1108971 | 6/1961 | Germany . |
| 2402411 | 7/1975 | Germany . |
| 392897 | 8/1973 | U.S.S.R. . |
| 436778 | 12/1976 | U.S.S.R. .............. 56/10.2 E |
| 625648 | 9/1978 | U.S.S.R. . |
| 1410884 | 7/1988 | U.S.S.R. . |
| 2056238 | 3/1981 | United Kingdom . |

OTHER PUBLICATIONS

Balluff Catalogue, pp. 9 and 14.

Farm Journal, "Listen to Your Soil", pp. 13 and 15; Jan., 1993.

Mannesmann Rexroth Catalogue, "Proportional Pressure Reducing Valve Model DRE/DREM (Series 5X)", pp. 1–3; May, 1994.

*Primary Examiner*—Randolph A. Reese
*Assistant Examiner*—Christopher J. Novosad
*Attorney, Agent, or Firm*—Arnold, White & Durkee

[57] ABSTRACT

An agricultural planter comprises a frame with a plurality of wheels and adapted to be towed by a tractor. The planter has a plurality of row planting units mounted on the frame and carrying planting implements, and the planting units are vertically movable relative to the frame. A soil-hardness sensing unit carried on the frame produces a signal representing the hardness of the soil. A controllable biasing device is connected to the planting units for adjusting the force applied to the soil by the planting units, in response to the signal representing the hardness of the soil.

3 Claims, 14 Drawing Sheets

U.S. PATENT DOCUMENTS

| | | |
|---|---|---|
| 4,307,674 | 12/1981 | Jennings et al. . |
| 4,359,101 | 11/1982 | Gagnon . |
| 4,377,979 | 3/1983 | Peterson et al. . |
| 4,407,371 | 10/1983 | Hohl . |
| 4,461,355 | 7/1984 | Peterson et al. . |
| 4,499,775 | 2/1985 | Lasoen . |
| 4,508,178 | 4/1985 | Cowell et al. ............................ 172/239 |
| 4,550,122 | 10/1985 | David et al. . |
| 4,596,200 | 6/1986 | Gafford et al. . |
| 4,658,639 | 4/1987 | Arnberg . |
| 4,671,193 | 6/1987 | States . |
| 4,726,304 | 2/1988 | Dreyer et al. . |
| 4,744,316 | 5/1988 | Lienemann et al. . |
| 4,785,890 | 11/1988 | Martin . |
| 4,930,431 | 6/1990 | Alexander . |
| 4,944,141 | 7/1990 | Orlando et al. .................. 56/10.2 E X |
| 5,076,180 | 12/1991 | Schneider . |
| 5,092,255 | 3/1992 | Long et al. . |
| 5,113,957 | 5/1992 | Tamai et al. ............................... 172/10 |
| 5,129,282 | 7/1992 | Bassett et al. . |
| 5,240,080 | 8/1993 | Bassett et al. . |
| 5,255,617 | 10/1993 | Williams et al. . |
| 5,341,754 | 8/1994 | Winterton . |
| 5,351,635 | 10/1994 | Hulicsko . |
| 5,398,771 | 3/1995 | Hornung et al. . |
| 5,479,992 | 1/1996 | Bassett ........................................ 172/4 |
| 5,499,683 | 3/1996 | Bassett ........................................ 172/4 |

AGRICULTURAL PLANTER

CROSS-REFERENCE TO RELATED APPLICATIONS

This application is a continuation-in-part of pending U.S. Pat. application Ser. No. 08/367,990 filed Jan. 3, 1995, for "Planter Unit", and now pending, which in turn is a continuation-in-part of applications Ser. Nos. 08/073,573 filed Jun. 8, 1993, for "Apparatus For Preparing Soil for the Placement of Seed and Additives"; 08/097,977 filed Jul. 27, 1993, for "Soil Treating System With Hydraulically Actuated Implement Controller", now U.S. Pat. No. 5,499,683; 08/097,978 filed Jul. 27, 1993, for "Agricultural Implement Controller to Compensate for Soil Hardness Variation", now U.S. Pat. No. 5,479,992; and 08/189,840 filed Feb. 1, 1994, for "Mechanism for Planting Agricultural Seed", now abandoned.

FIELD OF THE INVENTION

This invention relates to agricultural equipment and, more particularly, to an agricultural planter for planting seeds in the soil and delivering fertilizer and/or other additives to the soil.

SUMMARY OF THE INVENTION

The present invention provides an agricultural planter which includes a frame with a plurality of wheels and adapted to be towed by a tractor. The planter has a plurality of row planting units mounted on the frame and carrying planting implements, and the row planting units are vertically movable relative to the frame. A soil-hardness sensing unit carded on the frame produces a signal representing the hardness of the soil. A controllable biasing device connected to the planting units adjusts the force applied to the soil by the planting units in response to the signal representing the hardness of the soil.

BRIEF DESCRIPTION OF THE DRAWINGS

FIG. 8 is a plan view of a planting system including a planter unit, as in FIGS. 1 and 2, and a tractor with two additional six-row planter units attached to increase the capacity;

DETAILED DESCRIPTION OF THE DRAWINGS

Figure 1:
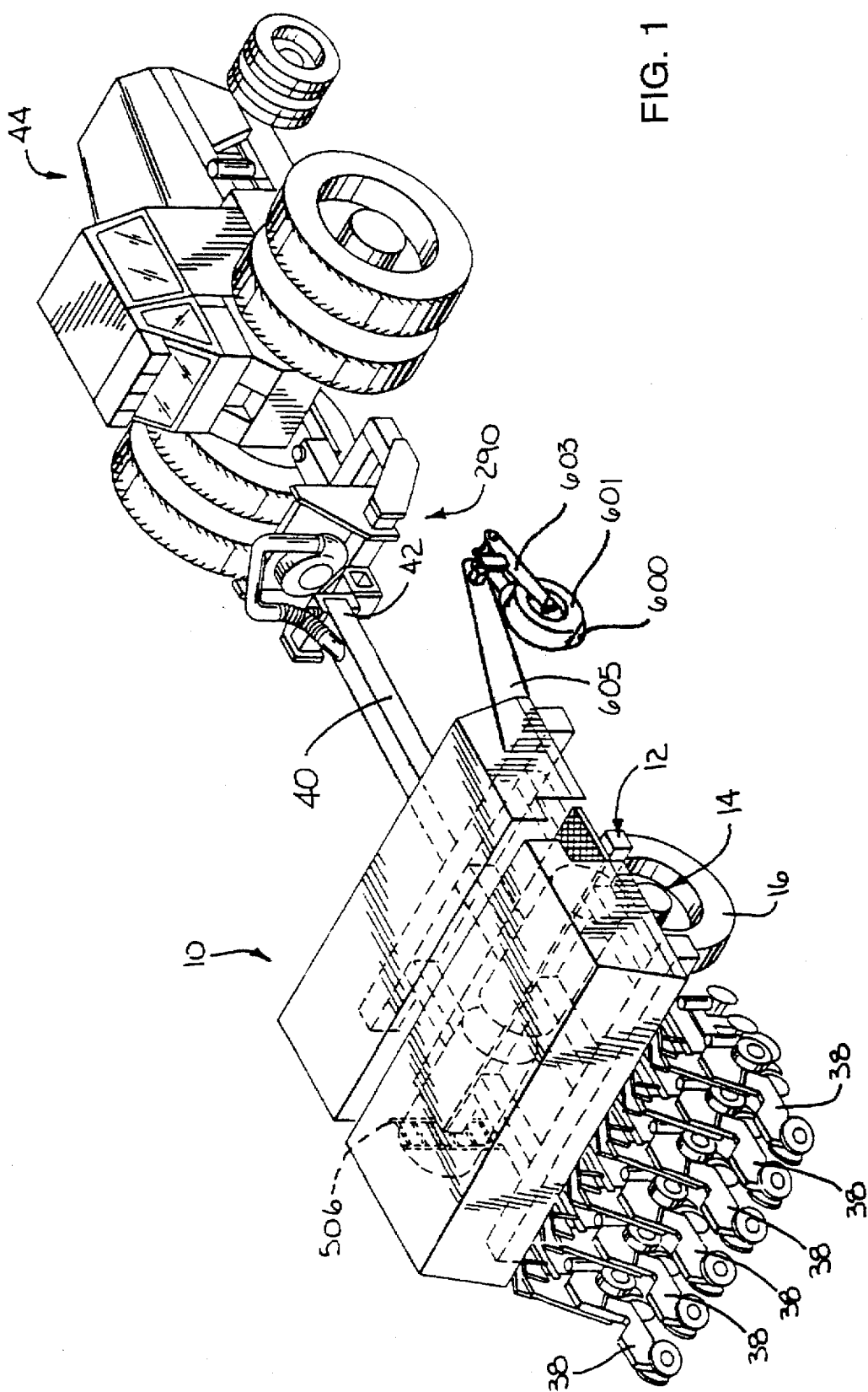
FIG. 1 is a perspective view of a six-row planter unit embodying the present invention, connected to a tractor.
Figure 2:
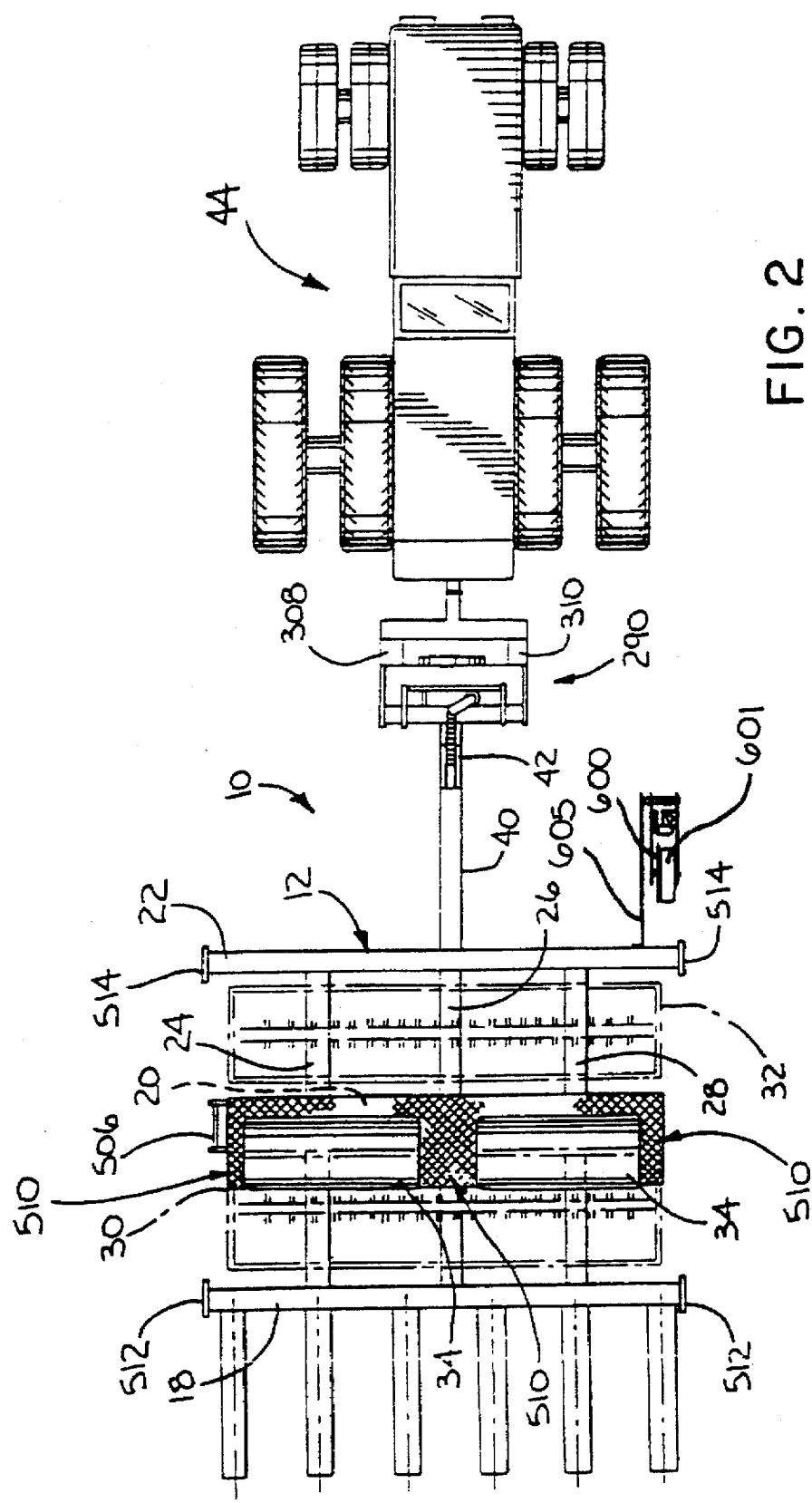
FIG. 2 is a plan view of the planter unit and tractor of FIG. 1 with the protective covers, over the seed and additive containers removed.
Figures 3, 4:
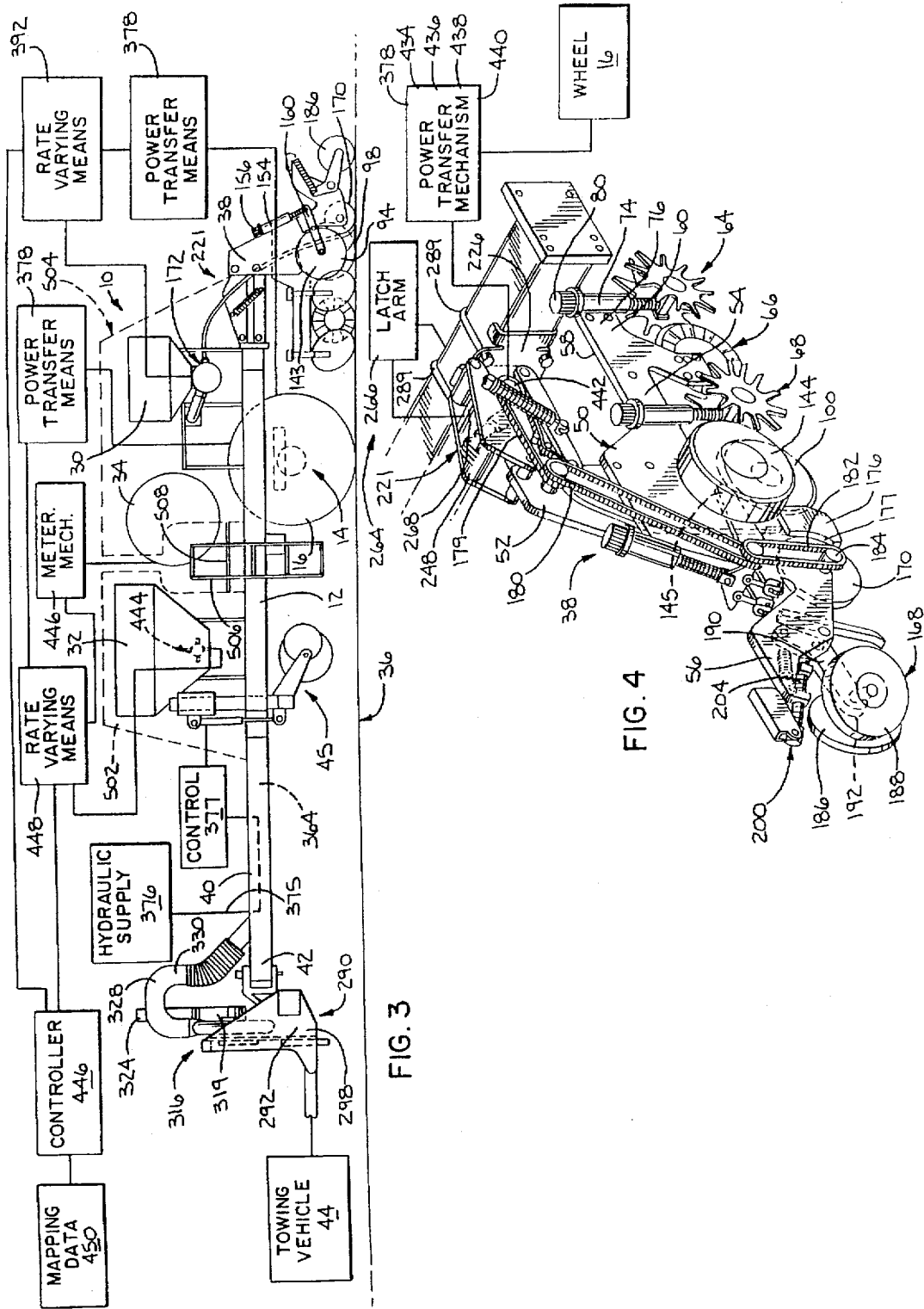
FIG. 3 is an enlarged side elevation of the planter unit of FIGS. 1 and 2.
FIG. 4 is an enlarged, perspective of a single row unit on the planter unit of FIGS. 1-3.
Figure 17:
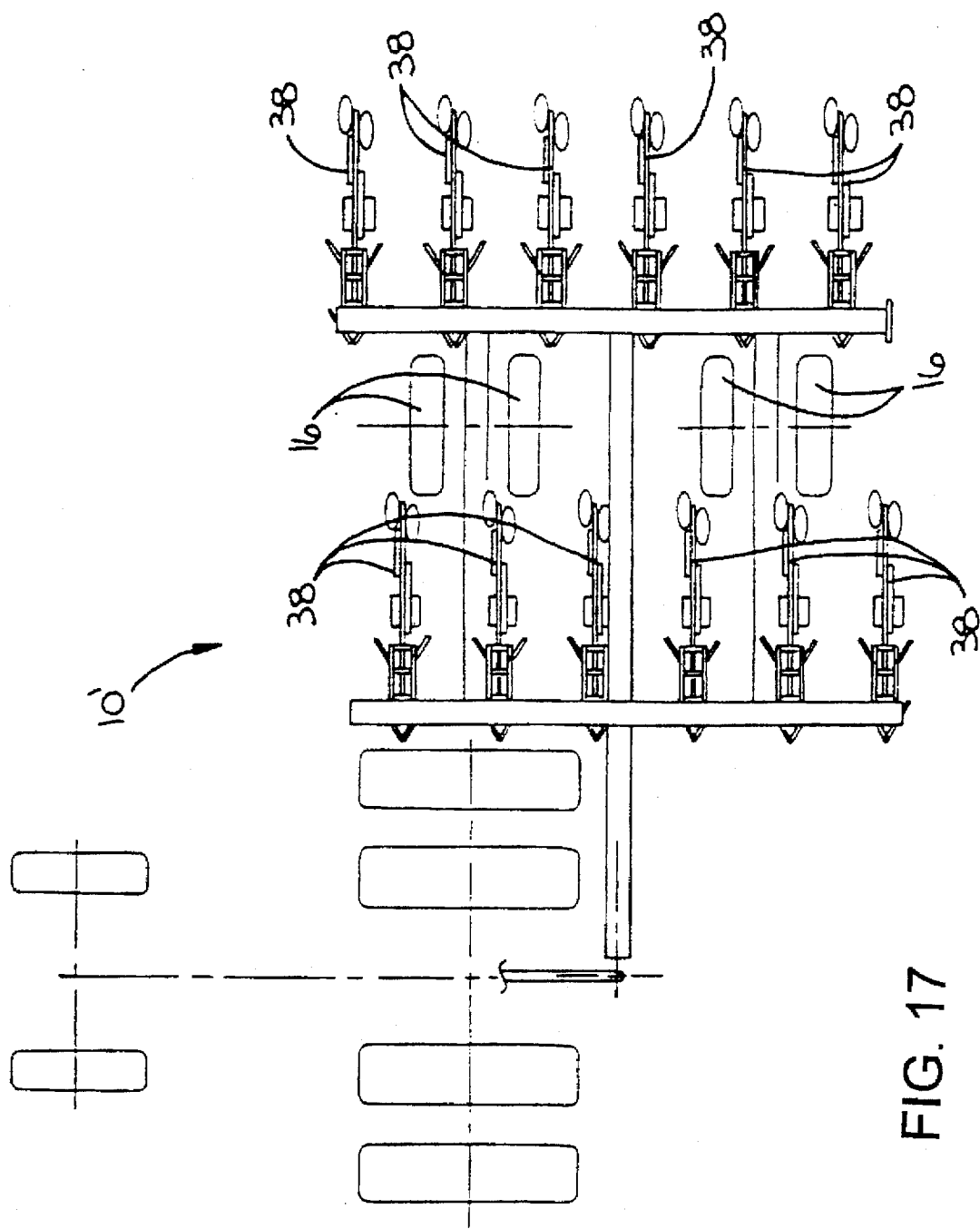
FIG. 17 is a schematic plan view of a twelve-row planter unit embodying the invention attached to a tractor.

Turning now to the drawings and referring first to FIGS. 1-3, a preferred form of planter unit, according to the present invention, has a towing frame 12 which is supported in a fixed, elevated position by a wheeled carriage 14. The carriage 14 has two laterally spaced wheels 16 which facilitate rolling movement of the planter unit 10 over underlying terrain. In a modified form, two wheels 16 are provided on each side of the towing frame 12, as shown in FIG. 17.

The towing frame 12 includes three laterally extending, square beams 18, 20, 22 joined with three other square beams 24, 26, 28 extending in a fore and aft direction, to form a solid support for a bulk seed container 30, an additive container 32 and laterally spaced additive container tanks 34. Dry or liquid primary fertilizer can be contained in bulk quantities in the additive container 32 for delivery to underlying soil at a location 36. Starter fertilizer, herbicide or like additive, is contained in bulk, liquid form in the tanks 34. This additive is delivered, together with seed from the container 30, to underlying soil through row units 38 attached in a trailing position on the towing frame 12. Six of the row units 38 are shown and laterally spaced at regular intervals behind the towing frame 12, with the spacing determining the distance between seed rows.

The towing frame 12 has a forwardly projecting draw bar 40 with a tongue 42 at its forward free end that removably attaches to a tractor 44 to move therewith in a forward towing direction. As the planter unit 10 is advanced by the tractor 44, fertilizer coulter wheel assemblies 45, corresponding in number and spacing to the seed rows, work the soil and deliver the desired amount of primary fertilizer to the soil. These wheel assemblies 45 are translatable together in a vertical line for depth control. A mechanism for accomplishing this is described in detail in co-pending U.S. application Ser. No. 08/221,250, filed Mar. 31, 1994, for "Apparatus For Controlling Down Pressure On Agricultural Implements".

The trailing row units 38 resituate residue away from the planting line, part the cleared soil to form a seed slot, deposit seed in the seed slot and fertilizer adjacent to the seed slot, and close the seed slot by distributing loosened soil thereover. The multiple row units 38 on the planter unit 10 are identical in construction, and thus the description will be limited to one exemplary row unit 38, as shown in FIGS. 4–7, 12 and 13.

The foundation of the row unit 38 is a frame 50 formed by three unitary rigid plates 52, 54 and 56 bolted together. The plates 52, 54 and 56, aside from facilitating mounting of various soil engaging components, as described below, add considerable weight to the row unit 38. Preferably, each of the plates 52, 54 and 56 is constructed from flat metal stock having a thickness of 0.75 to 1.5 inches. In a preferred form, the plates 52, 54 and 56 are fabricated from one-inch stock. The overall weight of each row unit 38, as depicted, is on the order of 700 pounds, principally by reason of the weight of the plates 52, 54 and 56. If desired, the plates 52, 54 and 56 may be cast or joined by welding.

The first plate 52 has a generally rectangular configuration with the longer dimension thereof aligned vertically on the tow unit 38. As seen most clearly in FIG. 5, the vertical dimension of the first plate 52 preferably extends over one half the distance D between the top and bottom of the tow unit 38, and in this particular embodiment, extends vertically over approximately 80% of the distance D.

The second plate 54 is elongate, with the length thereof extending in a fore and aft direction on the row unit 38. The second plate 54 has a dimension in the fore and aft direction that is at least equal to one half the distance D1 between the front and rear of the row unit 38. In this particular embodiment, the second plate 54 extends in a fore and aft direction through a distance of approximately 60% of the distance D1.

The third plate 56 is rigidly attached at the trailing end of the second plate 54 so that the combined length of the second and third plates 54 and 56 is on the order of 90% of the distance D1.

The assembled first and second plates 52 and 54 have their longer dimensions transverse to each other to cooperatively define a T or L shape, with the first plate 52 defining a vertically extending cross bar and the second plate 54 defining a stem extending in a fore and aft direction. The second plate 54 has oppositely facing, flat surfaces 58 and 60, which facilitate attachment and removal of, in this case, three soil-engaging components 64, 66 and 68.

The first soil-engaging component 64 consists of a meshing pair of rotary, toothed wheels 70 and 72. Suitable wheels are currently sold by the assignee herein under the registered trademark TRASHWHEEL™. These wheels 70 and 72 are supported in an operative position on a stem 74, which is removably held in an operative position at the front 76 of the second plate 54 by bolts 78. Structural details of the wheels 70 and 72 and the mounting stem 74 are described in more detail in U.S. Pat. No. 5,129,282, which is incorporated herein by reference. The angular arrangement of the wheels 70 and 72 causes the wheels to rotate as they are dragged through the underlying soil. This rotation produces a scissors-like action on soil and residue and distributes the residue to the sides of the seed line. The vertical position of the wheels 70 and 72 can be altered by rotating a graspable cap 80 at the top of the stem 74, as described in more detail in U.S. Pat. No. 5,240,080, which is incorporated herein by reference. The bolts 78 are extendable selectively through a first pair of bores 82 and a rearwardly offset second pair of bores 84, to maintain the soil-engaging component 64 in either of two different positions relative to the plate 54.

The second soil-engaging component 66 is a coulter wheel that is bolted to a depending leg 86 on the plate 54 in one of two positions, depending upon whether the bolts are extended through a first set of bores 88 or a second set of bores 90, spaced rearwardly therefrom. The cooperative arrangement of the two components 66 and 68 is described in more detail in co-pending U.S. application Ser. No. 08/073,573, filed Jun. 8, 1993, for "Apparatus For Preparing Soil for the Placement of Seed and Additives", which is incorporated herein by reference.

The third soil-engaging component 68 has the same construction as the first soil-engaging component 64 and is mounted to the plate 54 rearwardly of the second soil-engaging component 66. The component 68 is attached to the plate 54 in the same manner as the first component 64.

It can be seen that the components 64, 66 and 68 can be conveniently accessed from either side of the plate 54 to facilitate attachment and removal, as to effect relocation or, repair thereof.

Figure 7:
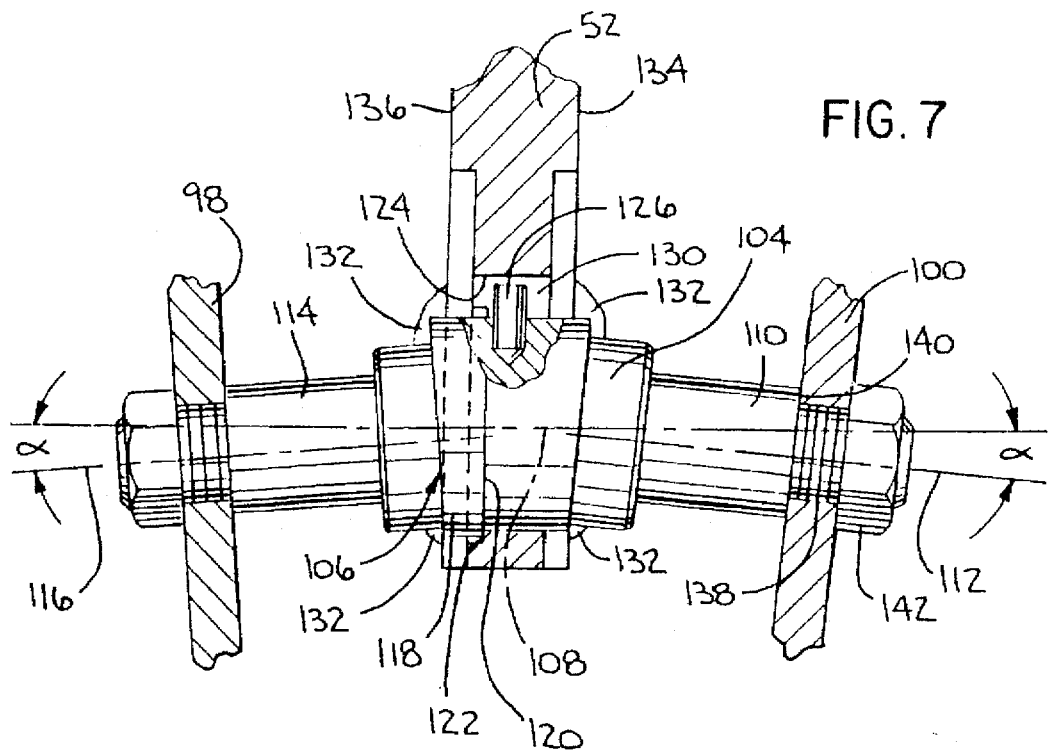
FIG. 7 is an enlarged, partial cross-sectional view of a shaft used to mount soil working wheels on the row unit of FIGS. 4-6.
Figure 9:
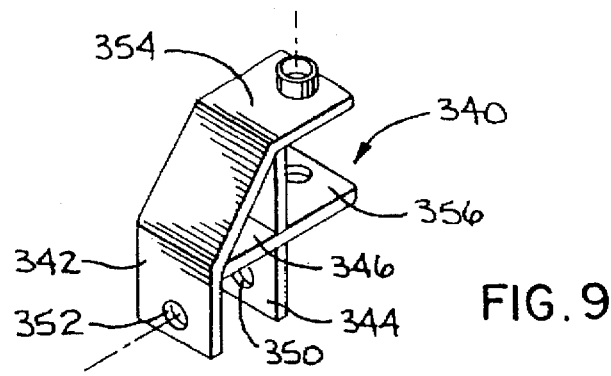
FIG. 9 is an enlarged, perspective of an adapter used to connect the planter unit to a tractor.
Figure 10:
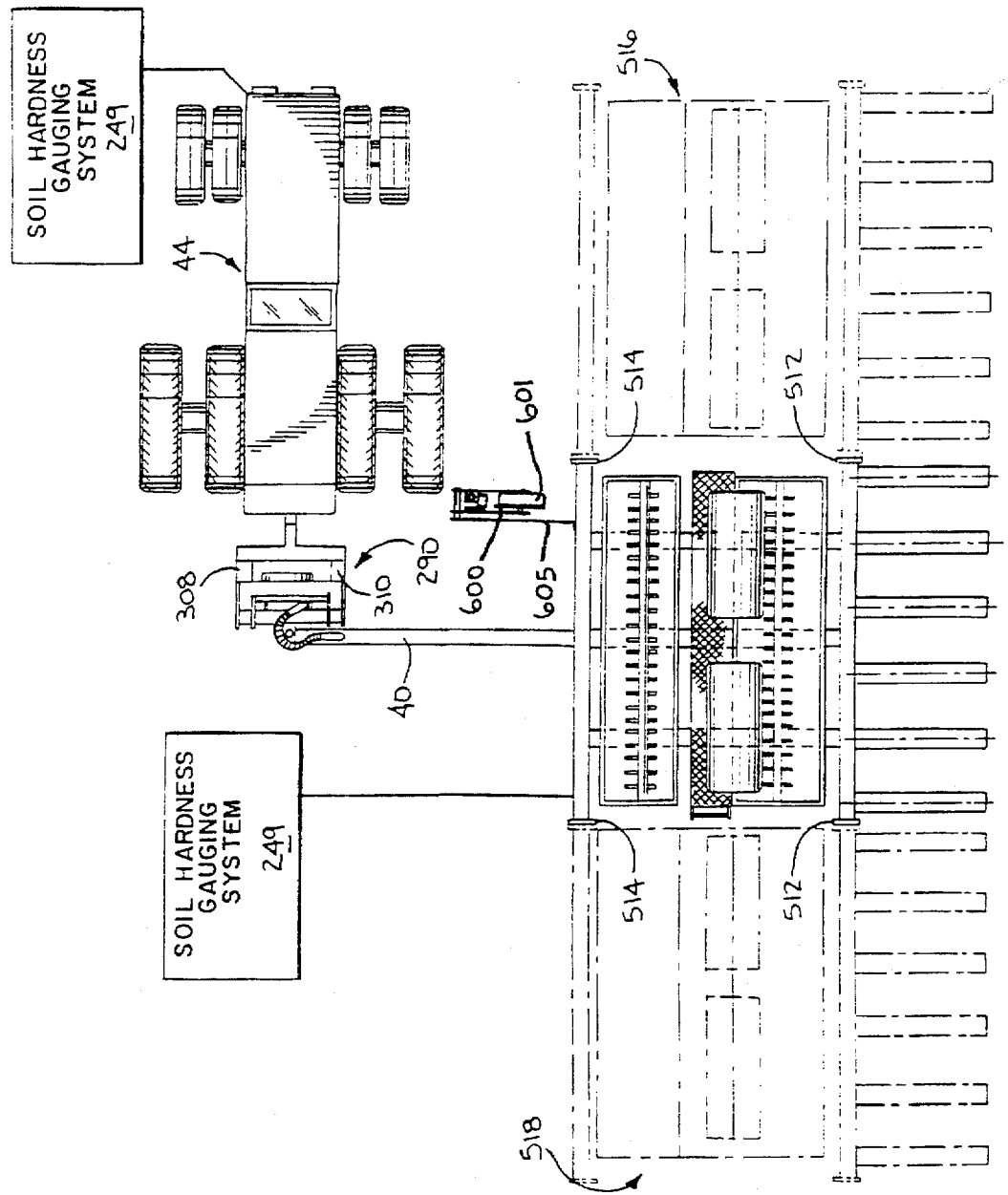
FIG. 10 is an enlarged, exploded, perspective of the connection between the planter unit and a hitch subassembly including a system for pressurizing and delivering a fluid to the planter unit.
Figure 11:
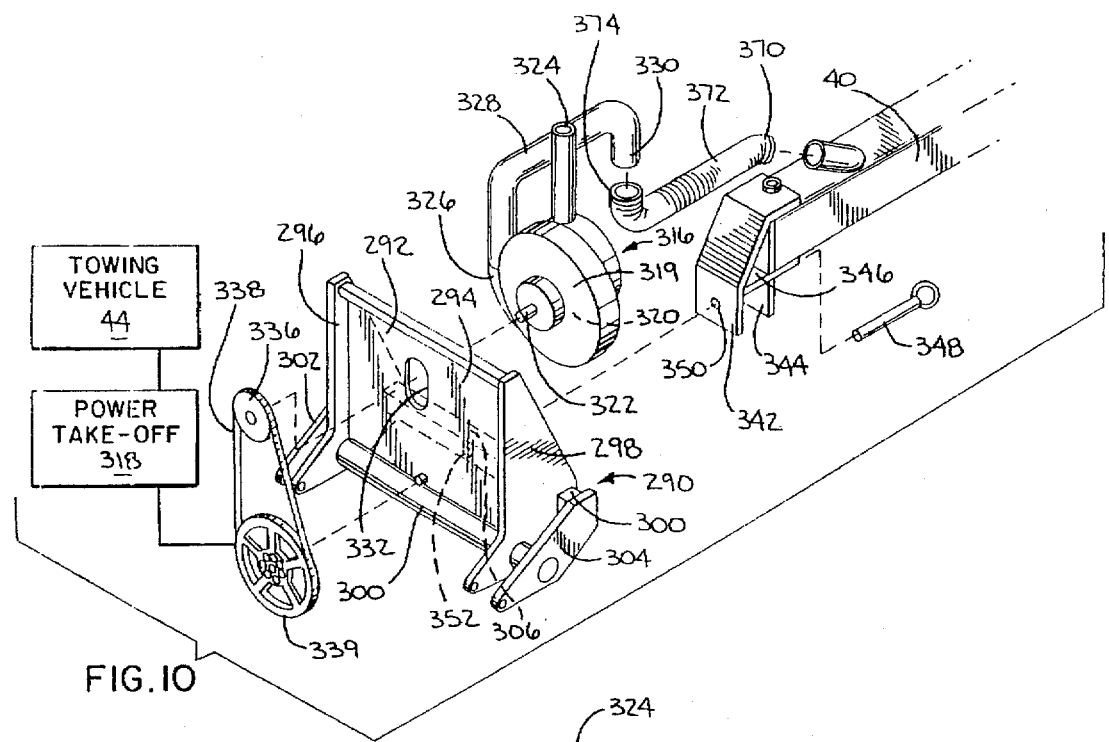
FIG. 11 is an enlarged, side elevation of the draw bar on the planter unit attached to the hitch subassembly and with the fluid pressurizing system in an operative position to be connected to a power take off on a tractor.

Separate soil-engaging components 92 and 94 are attached in an operative position on the first plate 52. The component 92 consists of a pair of disks 98 and 100, which are angularly arranged so as to diverge both rearwardly and upwardly. This arrangement causes the disks 98 and 100 to part the underlying soil to define a seed slot. This disk pair 98, 100 is commonly referred to in the industry as a "V-opener". A single-piece shaft 104, as shown in FIG. 7, is used to attach the disks 98 and 100 consistently in an operative position on the plate 52. More particularly, the shaft 104 has a central frame mounting portion 106 with a central axis 108. A first wheel-mounting portion 110, with a central axis 112, projects in cantilever fashion away from the frame-mounting portion 106. The axes 108 and 112 make an angle α with respect to each other of approximately 4½°.

A second wheel-mounting portion 114, with a central axis 116, projects axially oppositely to the wheel-mounting portion 110 such that the central axis 116 thereof makes the same angle α with the central axis 108 of the frame-mounting portion 106. The frame-mounting portion 106 has a larger diameter than the wheel-mounting portions 110 and 114. The frame-mounting portion 106 has a radially enlarged portion 118 defining an axially facing shoulder 120, which is abuttable to a facing surface 122 defined by an undercut on the frame plate 52.

To assemble the shaft 104, the first wheel-mounting portion 110 is directed from left to right in FIG. 7 through a bore 124 in the plate 52. The shoulders 120 and 122 will abut with the shaft 104 and frame plate 52 in consistent alignment axially of the shaft 104, with the shaft 104 in the operative position of FIG. 7. To prevent relative rotation between the shaft 104 and plate 52 about the axis of the shaft 104, with the shaft 104 in the operative position of FIG. 7, a pin 126 is provided on the frame-mounting portion 106 and projects radially therefrom into a receptacle 130 on the frame plate 52. This arrangement makes it virtually impossible to improperly assemble the shaft 104. Once the shaft 104 is placed in the operative position of FIG. 7, it can be fixedly maintained on the plate 52, as by a weld 132.

With the shaft 104 fixed in its operative position, the cantilevered wheel-mounting portions 110 and 114 are conveniently accessible from the opposite, flat side surfaces 134 and 136 of the plate 52. The wheel-mounting portion 110 has a reduced-diameter portion 138 that defines an axially facing shoulder 140 to abut the disk 100. The reduced-diameter portion 138 is threaded to accept a nut 142, which locks the disk 100 onto the wheel-mounting portion 110. The disk 98 is attached in like fashion to the wheel-mounting portion 114 on the opposite end of the shaft 106.

The component 94 consists of a pair of gauge wheels 143 and 144, as seen in FIGS. 3–6 and 13, which maintain the frame 50 at a desired height relative to the underlying terrain. Each gauge wheel 143, 144 is mounted in similar fashion to the plate 52. Thus, the description herein will be limited to the exemplary gauge wheel 144.

The gauge wheel 144 is bolted to one end 145 of an elongate link 146. A pin 148 at the mid-portion of the link 146 permits the link 146 to pivot about a laterally extending axis. The opposite end 150 of the link 146 is attached to a plate 152 that is selectively raised and lowered by an adjusting mechanism 154 through a rotatable, graspable cap 156. The plate 152 is moved downwardly to pivot the link end 145 and the associated gauge wheel 144 upwardly to thereby lower the frame 50. Elevation of the plate 152 produces the opposite result.

The plate 152 is pivotably mounted to the adjusting mechanism 154 through a pin 158 that allows the plate 152 to swivel about a fore and aft axis. A connector 160 on the plate 152 is pivotably connected to the link end 150. With a similar arrangement on both links 146 and 162, these links and the associated gauge wheels 143 and 144 are permitted to move up and down relative to each other. To avoid interference with the gauge wheels 143 and 144 as they move up and down, the plate 54 has a cutout 164 which generally follows the curvature of the gauge wheels.

The third plate 56 mounts soil-engaging components 166 and 168. The soil-engaging component 166 is a press wheel 170 that presses seed introduced into a seed slot firmly into the soil at the bottom of the slot. This structure is described in more detail in co-pending U.S. application Ser. No. 08/189,840, filed Feb. 1, 1994, for "Mechanism For Planting Agricultural Seed", which is incorporated herein by reference. It suffices to say that seed from the container 30 is delivered through a metering mechanism 172 (FIG. 6) into a conduit 174 for delivery from the free end 175 thereof into a seed slot. With the plates 52 and 54 in assembled relationship, a space is defined therebetween to allow the conduit 174 to be threaded downwardly to the bottom free end 176 of the plate 52. The free end 176 has an edge 177 that conforms to the curvature of the press wheel 170. This free plate end 176 shields the seed introduction area and the conduit free end 175.

Seed is discharged at regular intervals as the row unit 38 is advanced. The seed is propelled by the metering mechanism 172 into the base of the seed slot immediately in front of the advancing press wheel 170. The press wheel then firmly plants the seed. The press wheel 170 is driven off the carriage wheel 16 through an intermediate mechanism 178, which serially rotates endless chains 179, 180 and 182, with the chain 182 effecting rotation of a laterally extending shaft 184 on the press wheel 170.

If desired, a fertilizer knife may also be mounted on the planter to deposit fertilizer in the soil adjacent the seed slot, as described in detail in my pending U.S. patent application Ser. No. 08/143,075, filed Oct. 25, 1993, for "Apparatus For Continuously Planting Seed And Applying A Soft Additive," which is incorporated herein by reference.

The soil-engaging component 168, as seen clearly in FIGS. 3–6 and 12, consists of a pair of closing wheels 186 and 188 which are mounted to an L-shaped link 190 in an orientation wherein they diverge upwardly in conventional fashion. The link 190 has a first leg 192, at the free end of which the closing wheels 186 and 188 are operatively connected. The link 190 is pivotally connected to the plate 56 at its mid-portion 194 by a pin 196. The other link leg 198 projects upwardly from the pivot pin 196.

Figure 12:
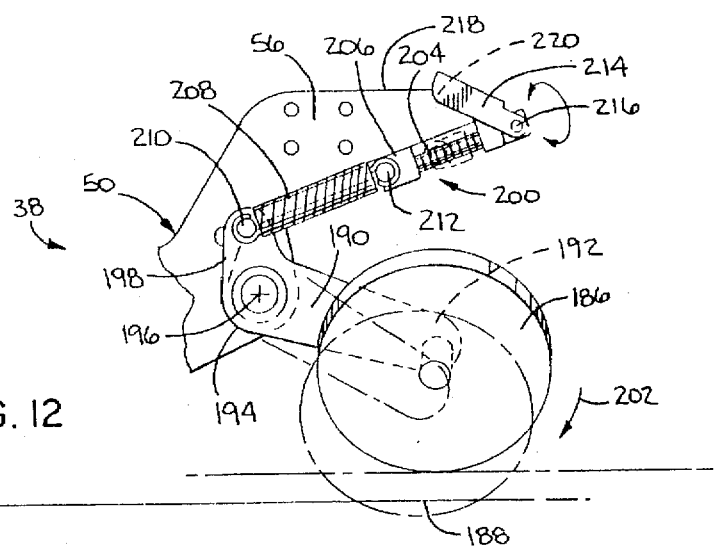
FIG. 12 is an enlarged, fragmentary, side elevation of a closing wheel on the row unit.
Figure 13:
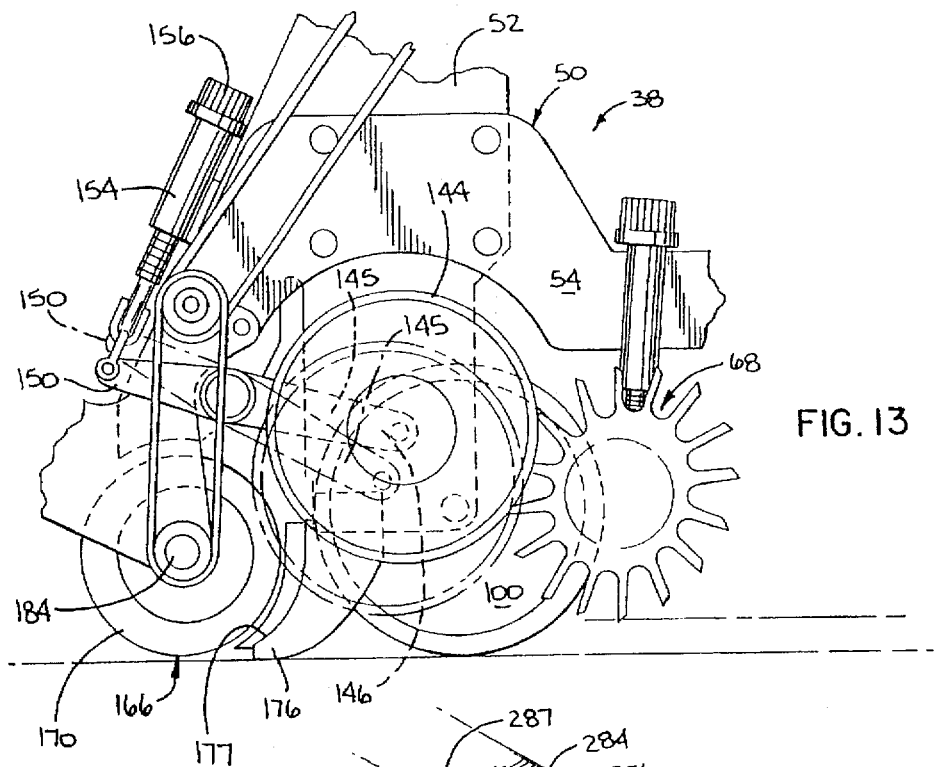
FIG. 13 is an enlarged, fragmentary, side elevation of a portion of the row unit, including movable gauge wheels thereon.
Figure 14:
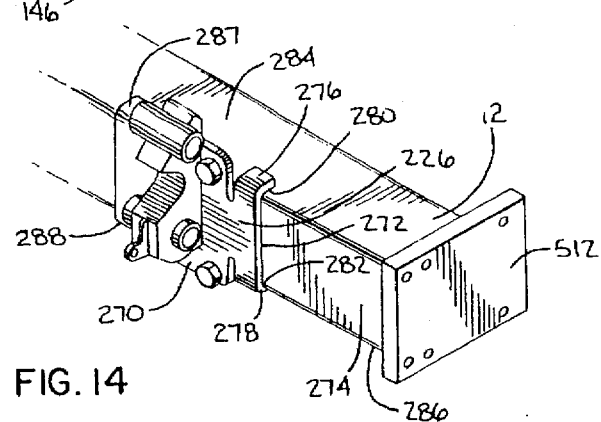
FIG. 14 is an enlarged, perspective of a mounting plate for connecting the row unit to a towing frame.
Figure 15:
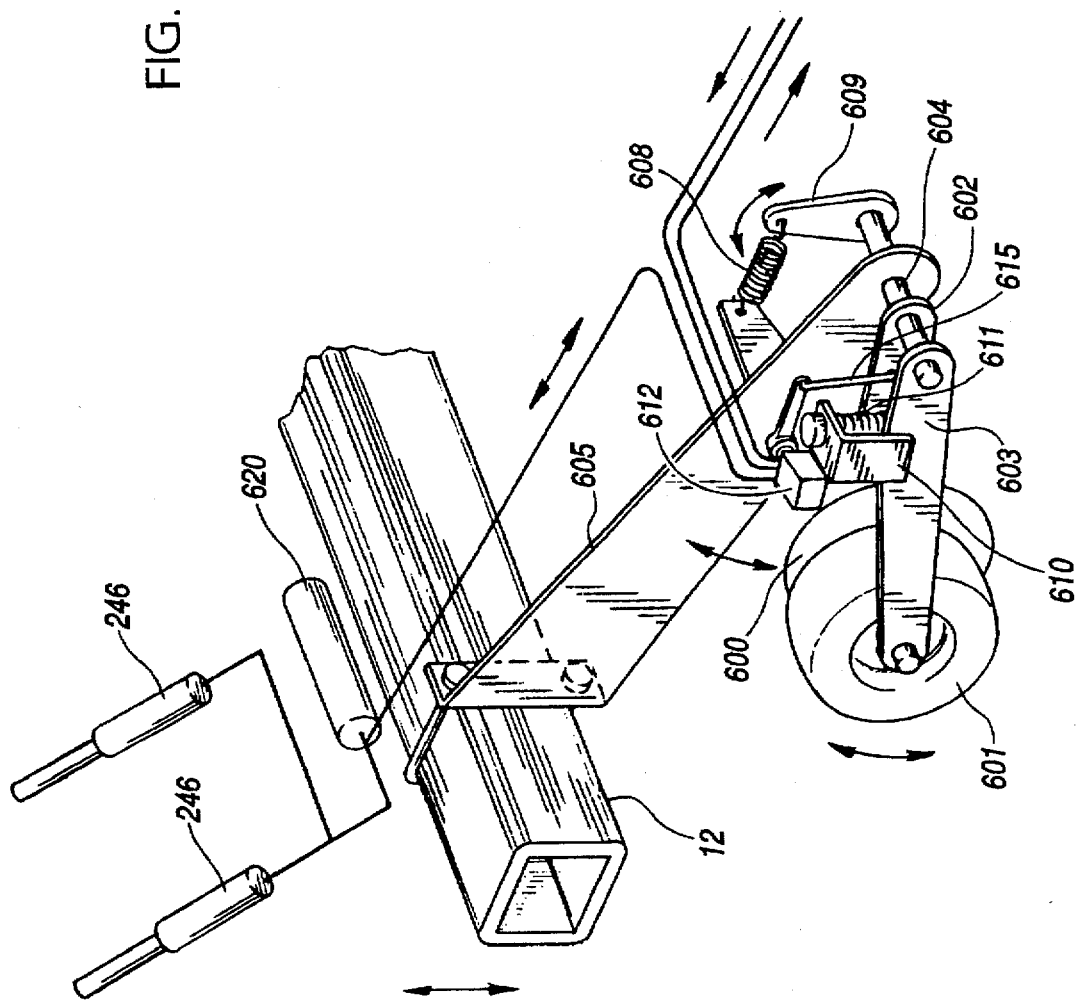
FIG. 15 is a perspective of a system for sensing the hardness of the soil and generating a corresponding control signal.
Figure 16:
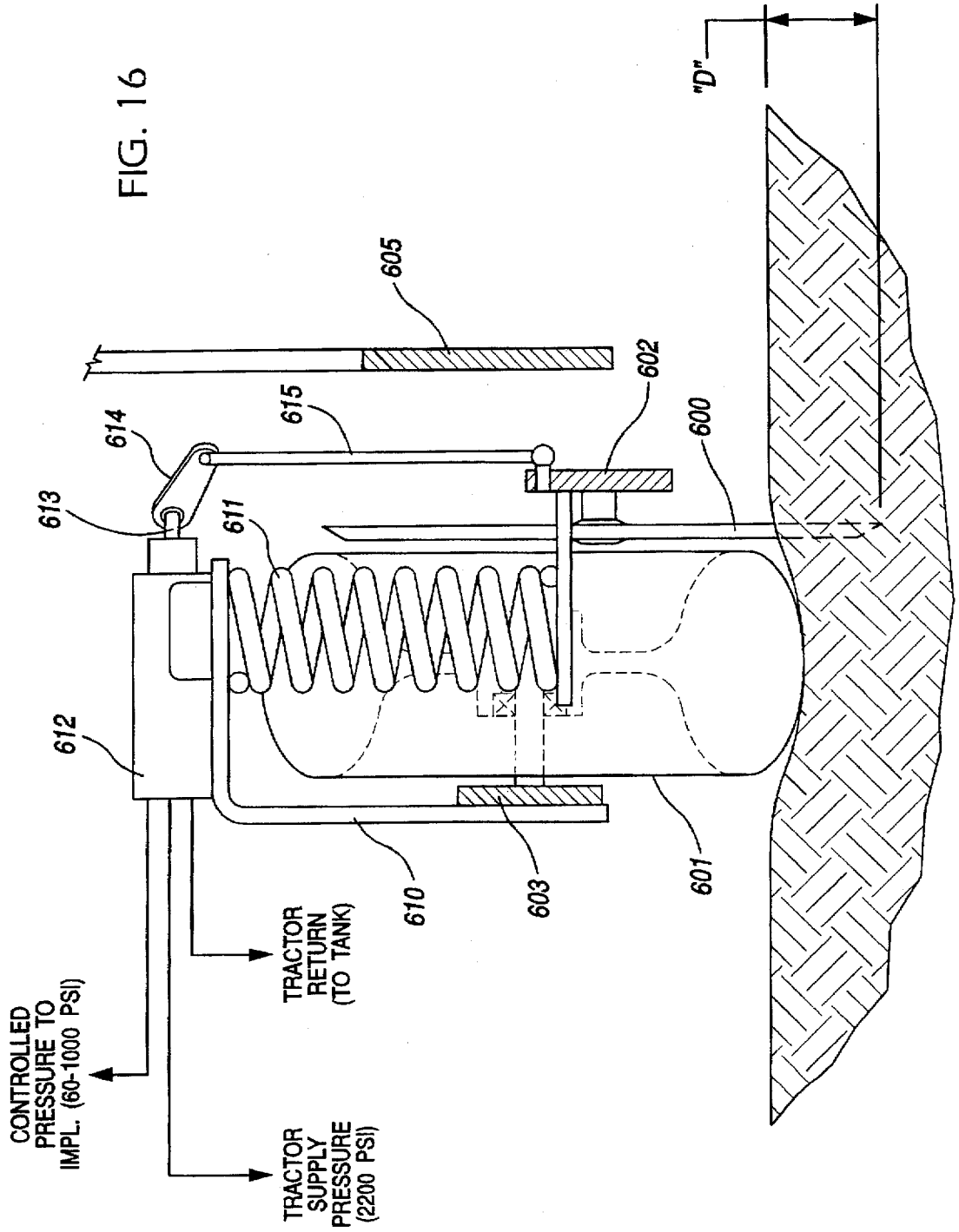
FIG. 16 is an enlarged end elevation of the soil-hardness sensing unit in FIG. 15.

Biasing means 200 exerts a bias force on the link leg 198 to urge the wheels 186 and 188 in a clockwise pivoting direction in FIG. 12, i.e., in the direction of arrow 202 around the pivot pin 196. The biasing means 200 consists of an elongate rod 204 threadably attached to a block 206 so that the block 206 is movable lengthwise relative to the rod 204 by effecting relative rotation between the rod 204 and the block 206. A tensioned coil spring 208 is connected to a pin 210 on the link leg 198, and a pin 212 on the block 206. Movement of the block 206 from left to right in FIG. 12 produces a greater tensile force on the link leg 198, which increases the downward force exerted by the wheels 186 and 188 on underlying terrain.

The bias exerted on the link 190 is conveniently variable by movement of a pivoting handle 214. Pivoting of the handle 214 in FIG. 12 in a clockwise direction about a pin 216 permits the handle 214 and the rod 204 to rotate. This represents the operative position for the handle. In the locked handle position of FIG. 12, the top edge 218 of the plate 56 resides in a receptacle 220 on the handle 214. This cooperative arrangement acts as a means to lock the handle 214, and thus the rod 204, against rotation.

A four-bar linkage 221 (FIGS. 3–6) between the towing frame 12 and each row unit 38 attaches the row unit 38 to the towing frame so that the row unit both follows forward movement of the towing frame and is also movable vertically relative to the towing frame 12. This allows the row unit 38 to move conformingly over underlying terrain.

The four-bar linkage 221 defines a parallelogram in which a pair of laterally spaced upper links 222 and 224 have their opposite ends pivotally connected to the frame plate 52 and a mounting plate 226 fixed to the frame 12. A pair of laterally spaced lower links 228 and 230 have opposite ends likewise connected to the frame plate 52 and the mounting plate 226 on the frame 12. The pivot axes 232 and 234 for the upper links 222 and 224 are parallel to each other and to the pivot axes 236 and 238 for the lower links 228 and 230. The spacing between the axes 232 and 234 is the same as the spacing between the axes 236 and 238. Similarly, the spacing between the axes 232 and 236 is the same as the spacing between the axes 234 and 238. Tension coil springs 240 (one shown) are connected between the links 224, 230 and 222, 228.

A hydraulic cylinder 246 produces a lifting force on the row unit 38. This lifting force is necessary when soft soil is encountered and the heavy row unit 38 tends to sink therein. The hydraulic cylinder 246 acts between the frame mounting plate 226 and a rod 248 spanning the upper links 222 and 224. The cylinder 246 can be connected between (a) the upper links 222, 224, and the lower links 228, 230, (b) the links 222, 224, 228, 230 and the frame plate 52, (c) the links 222, 224, 228, 230 and the towing frame 12 or (d) the frame plate 52 and the towing frame 12. The cylinder 246 has a stroke that will produce a lift range of 18 inches for the row unit 38. This avoids the need to raise and lower the towing frame 12 relative to the underlying carriage 14.

While the cylinder 246 could be manually controlled at each individual row unit, the illustrative system simultaneously lifts all the row units 38, either manually from a remote location, or automatically in response to a sensing of varying soil hardness. As will be described in more detail below, the cylinder is preferably controlled by the pressure from an accumulator, which in turn is controlled by a soil-hardness-sensing unit.

As will be appreciated form the foregoing description, the gauge wheels 143, 144 determine the planting depth for the seed and the elevation at which fertilizer, herbicide, etc. are applied to the soil. The depth of penetration of the soil by the gauge wheels 143, 144 and thus the planting depth, is determined primarily by the weight of the row unit 38. Since the row unit 38 has a fixed weight, the amount of penetration of the soil by the gauge wheels 143, 144 varies with the hardness of the soil. Consequently, harder soil keeps the row unit at a higher elevation than softer soil. The result is that the seed may be deposited by the planter row unit at different depths throughout a field depending upon the hardness of the soil. Even if the soil hardness does not vary, in some fields the soil is sufficiently hard that the row unit 38 rides too high so that the disc pair 98, 100 defines too shallow a furrow and, as a result, the seed is planted too close to the surface of the soil.

In the preferred embodiment illustrated in FIGS. 1–2 and 15–16, the hydraulic cylinders 246 are controlled by a soil-hardness-sensing unit which includes a sensing wheel 600 and a gauge wheel 601 journaled on the ends of two separate support arms 602 and 603 carried by a common shaft 604. The shaft 604 in turn is supported on the lower end of an arm 605 which is rigidly attached to the main frame 12 of the planter.

To provide a frame of reference for soil hardness measurement, the gauge wheel 601 is made to have a substantial width transverse to the direction of travel of the towing vehicle so that the wheel remains substantially on the surface of even soft soft. As a consequence, the gauge wheel 601 remains at a substantially constant reference elevation on the subjacent soft. It will remain at a relatively constant elevation on either hard or soft soil in that it will not significantly penetrate the latter due to its substantial contact area with the soft. The sensing wheel 600 is preferably a sharp coulter wheel, seed disc opener blade, or other wheel having a considerably narrower width than the gauge wheel 601 so that the sensing wheel readily penetrates the subjacent soft. Thus, the vertical position of the sensing wheel 600 relative to that of the gauge wheel 601 provides an indication of soft hardness.

The support arm 603 for the gauge wheel 601 is rigidly attached (e.g., by welding) to one end of the shaft 604 so that the arm 605 and the shaft 604 move in unison. To urge the gauge wheel 601 against the ground, a spring 608 biases the shaft 604 in the counterclockwise direction, as viewed in FIG. 15. One end of the spring 608 is attached to the frame arm 605, and the other end is attached to a link 609 that is rigidly attached to the shaft 604. The spring 608 preferably applies a downward force of about 100 to 400 pounds to the axle of the gauge wheel 601.

The support arm 602 for the sensing wheel 600 is connected to the support arm 603 for the gauge wheel 601 by a bracket 610 and a compressed coil spring 611. Thus, the sensing wheel 600 is urged against the ground by both the shaft spring 608 (via the gauge wheel arm 603 and the bracket 610) and the bracket spring 611. The downward force applied to the sensing wheel axle by the spring 611 is preferably about 50 to 300 pounds. The wheels 600 and 601 are therefore able to move over uneven ground together while the relative movement between them continues to accurately reflect changes in soil hardness.

To permit the sensing wheel 600 to move up and down in accordance with variations in the hardness of the soil, the support arm 602 for the sensing wheel 600 is pivoted on the shaft 604. The sensing wheel 600 moves down relative to the gauge wheel 601 because of the ability of the thin sensing wheel 600 to penetrate into the soil.

In order to sense the magnitude of the vertical movement of the axis of the sensing wheel 600 relative to the axis of the gauge wheel 601, a pressure control valve 612 is mounted on the bracket 610 attached to the support arm 603 for the gauge wheel 601. The pressure control valve 612 includes a rotatable actuator 613 connected through a lever 614 and a link 615 to the support arm 602 of the sensing wheel 600. Thus, as the sensing wheel 600 moves up and down relative to the gauge wheel 601, the link 615 and lever 614 turn the actuator 613 of the control valve 612 so that the angular position of the actuator 613 varies in accordance with variations in the hardness of the soil. One example of a suitable control valve is a Model PRM2 Pressure Control Pressure Reducing Valve made by Parker.

The output pressure of the control valve 612 varies in proportion to variations in the angular position of the actuator 613, which in turn varies in proportion to changes in the angle α between the arms 602 and 603. As the sensing wheel 600 penetrates more deeply into the soil, the angle α increases so that the resulting output pressure from the control valve 612 indicates the softer soil. A decreasing angle α is representative of a harder soil, as indicated by the resulting output pressure. The output of the control valve 612 is connected to the cylinders 246 so that the cylinders 246 receive a hydraulic pressure that varies in proportion to variations in the hardness of the soil, as represented by the vertical position of the axis of the sensing wheel 600 relative to that of the axis of the gauge wheel 601. This causes the hydraulic cylinders 246 to increase or decrease the upward force applied to each of the planter row units 38.

The control line preferably includes an accumulator 620 connected between the control valve 612 and the individual hydraulic cylinders 246 of the planter row units 38. The accumulator 620 stores fluid at a pressure supplied by the control valve 612. This provides large instantaneous flows of oil at constant pressure to hydraulic cylinders 246, permitting the row units 38 to follow uneven terrain while maintaining relatively constant downward force on the gauge wheels 144. This produces a desired uniform seed depth and resultant early and uniform crop seedling emergence from the soil. If desired, the pressure in the accumulator 620 can also be manually controlled by a valve that is within the tractor cab or at least readily accessible to the operator therefrom.

Each of the individual planter row units 38 preferably has a weight sufficient to hold the row unit against the ground and to penetrate the hardest soil. When the planter is used with softer soil, the hydraulic cylinders 246 are used to apply an upward force to each individual planter row unit 38 to reduce the pressure of each unit on the ground, thereby preventing the row units 38 from penetrating too deeply into the soft soil. By adjusting this upward force on the planter row units 38 as a function of the soil condition as sensed by the soil hardness-sensing unit, the planting depth at which seeds are placed into the soil can be continuously controlled. Normally this planting depth control system will be set to plant the seeds and deliver fertilizer to the soil, at a uniform depth regardless of the soil hardness, but if desired the control system can be set to adjust the planting depth according to the hardness of the soil. For example, in certain conditions it might be desirable to plant seeds deeper in soft soil than in hard soil.

The hydraulic output of the control valve 612 can be used for different purposes. For example, a plotter can receive the hydraulic signal and continuously map the hardness of a field for future use. This allows the farmer to take appropriate steps to either alter the field conditions, through control of drainage, to vary the hardness, or the like, or to treat the hard and soft soil potions differently to maximize crop yield.

Since the soft hardness could vary along the width of the gang-mounted row units 38, a separate sensing unit can be provided for each row unit 38 and the hydraulic cylinders 246 could be individually controlled for each implement to further optimize seed and fertilizer placement to increase the field yield.

In certain soft conditions, such as terrain that is fairly even, the planter frame 12 and wheels 16 may themselves serve as the soil reference for the sensing wheel 600, in place of the gauge wheel 601. The frame 12 supports both the wheels 16 and the arm 605 which carries the sensing wheel 600, and thus the vertical position of the sensing wheel 600 relative to that of the arm 605 provides the desired indication of soil hardness. In this case the bracket 610 and the control valve 612 would be mounted on the arm 605 to sense relative movement between the arms 602 and 605.

Figure 5:
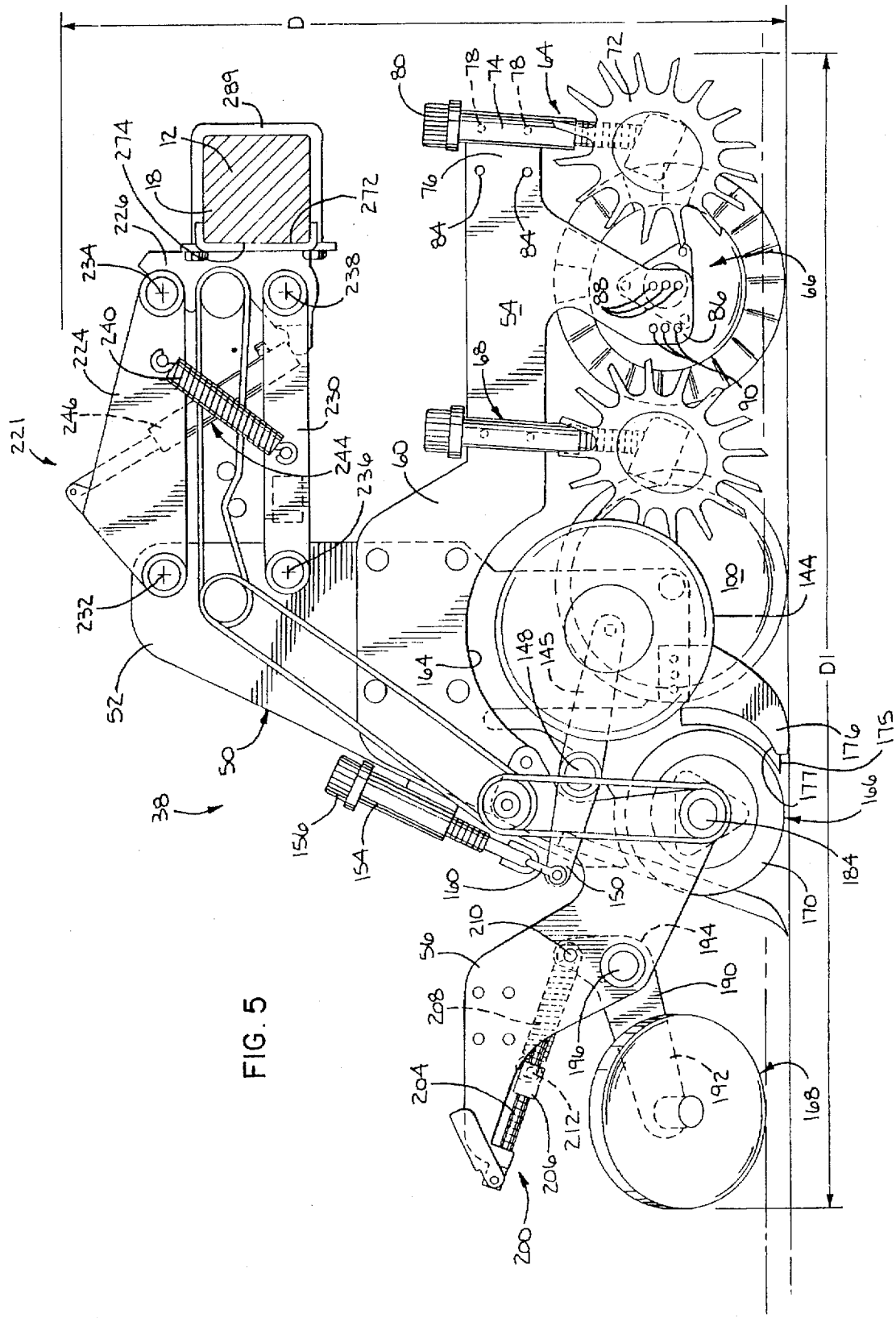
FIG. 5 is an enlarged, side elevation of the row unit of FIG. 4.
Figure 5A:
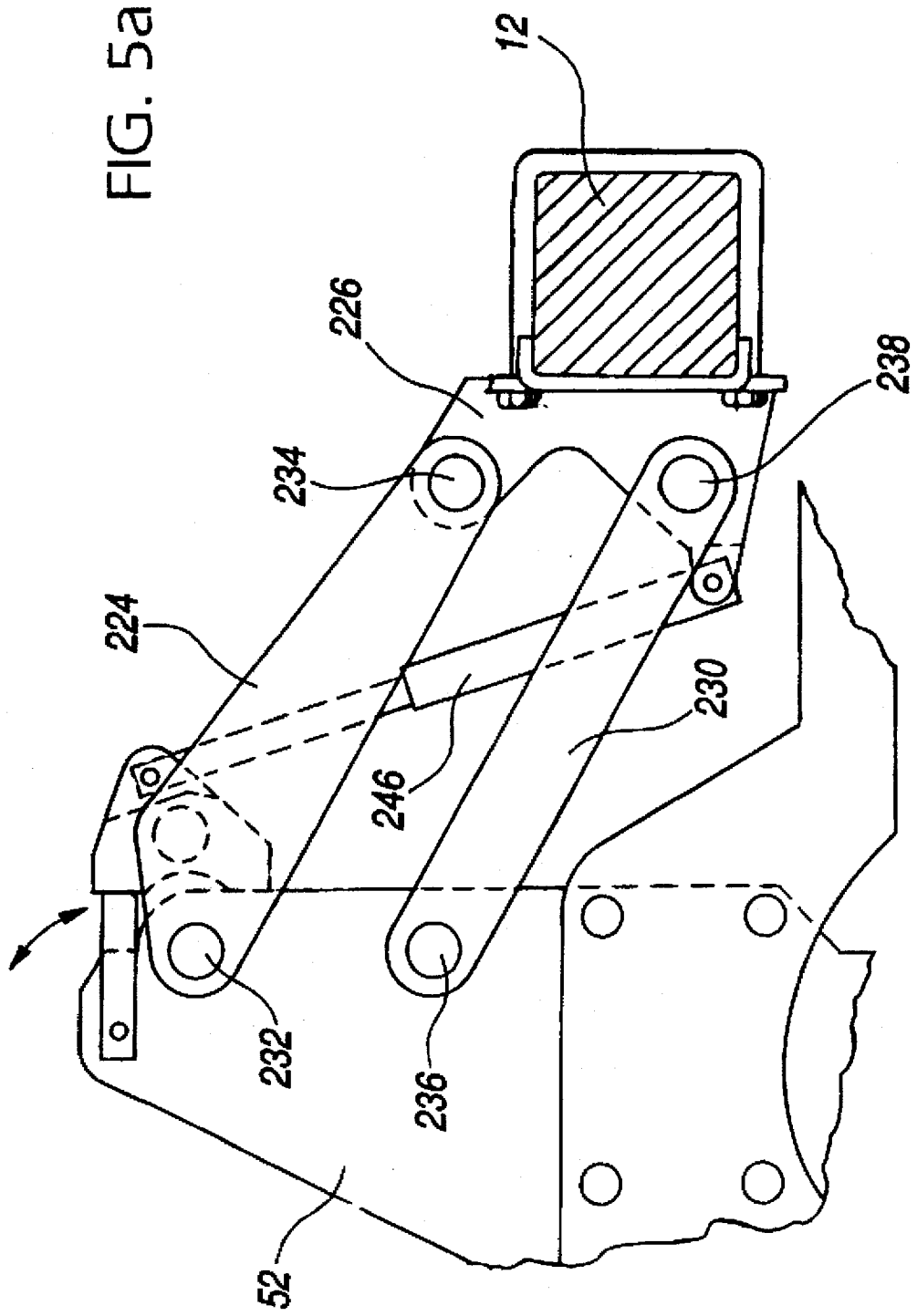
FIG. 5a is an enlarged view of a potion of the apparatus shown in FIG. 5, but in a raised, latched position.
Figure 6:
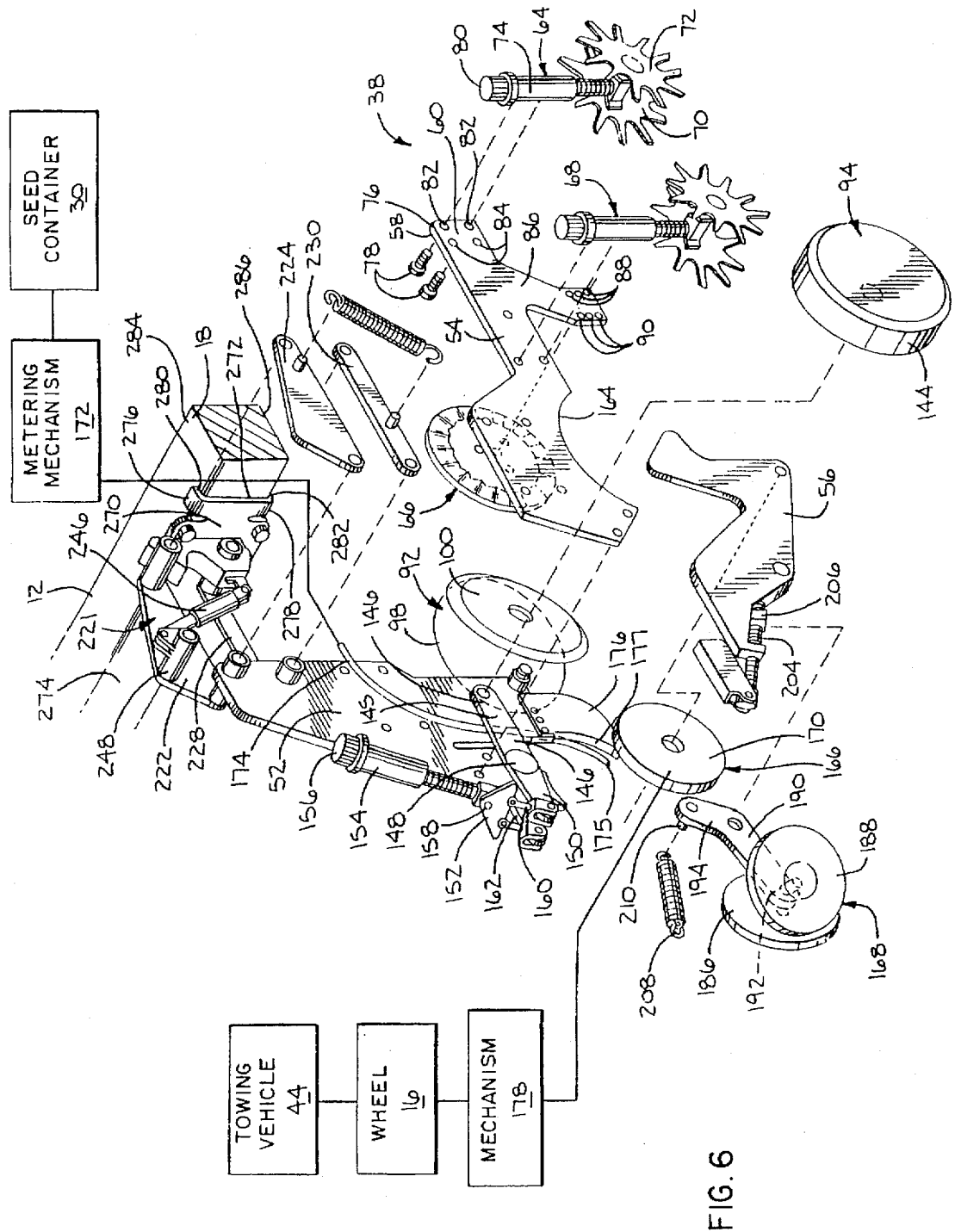
FIG. 6 is an enlarged, exploded, perspective of the row unit of FIGS. 4 and 5.

A latch 264 (FIG. 4) is provided to maintain the row unit 38 in a raised position. The latch 264 includes a latch arm 266 on the frame 12 and a latch pin 268 on the row unit 38 (see FIG. 5a), although this arrangement could be reversed. The latch 264 takes pressure off the cylinders 246 when the planter unit 10 is transported with the row unit 38 elevated.

As can be seen in FIGS. 4–6 and 14, the mounting plate 226 is formed to cooperate with the frame 12 so that the mounting plate 226 does not skew relative to the frame, particularly about fore and aft axes. The plate 226 has a body 270 with a flat surface 272 designed to facially abut a rearwardly facing flat surface 274 on the towing frame beam 18 which acts as a towing bar. A first pair of upper and lower rigid fingers 276 and 278 are bent away from the body 270 to define facing surfaces 280 and 282 which facially overlie the upwardly facing surface 284 and downwardly facing surface 285 on the towing bar 18. A similar pair of rigid fingers 287 and 288 are provided on the plate 226 in laterally spaced relationship to the fingers 276 and 278.

With this arrangement, forward movement of the mounting plate 226 in a first orientation relative to the towing bar causes the fingers 276 and 278 to captively embrace the towing bar 18. U-bolts 289 surround the towing bar 18 and draw the mounting plate 226 captively against the towing bar 18 to positively maintain the plate 226 in an operative position on the towing bar.

As shown in FIGs. 1–3 and 8–11, a hitch subassembly 290 has a frame 292 including a flat, upright wall 294 and spaced, transverse side walls 296 and 298. A front reinforcing bar 300 laterally spans the frame 292 and extends through the side walls 296 and 298 and laterally outwardly therefrom to mounting plates 302 and 304 spaced outside of the walls 296 and 298 respectively. A rear reinforcing bar 306 extends laterally through the side walls 296 and 298 and is fixed to the opposite side plates 302 and 304.

Laterally spaced hitch parts 308 and 310 project rearwardly from the tractor 44 to between the side wall 296 and plate 302, and between the side wall 298 and the plate 304. Once in this operative position, the connection between the hitch parts 308 and 310 and the frame 292 is maintained by removable pins 312. A pressurized air supply 316 is mounted in an operative position on the frame 294, and in that position can be operatively connected to a power take off 318 on the tractor 44. The pressurized air supply has a cylindrical housing 319 that defines an internal compression chamber. A fan blade 320 rotates in the housing chamber on a shaft 322 to centrifugally compress air drawn in from an inlet 324. The housing 319 has an outlet 326 to which an inverted, U-shaped fitting 328 is attached. The fitting 328 has a downwardly projecting outlet 330 which exhausts the pressurized air at a point above the draw bar 40.

With the pressurized air supply 316 operatively connected to the frame 294, the shaft 322 projects forwardly through an opening 332 in the frame wall 294. A pulley 336 is connected to the free end of the shaft 322 projecting forwardly through the frame 292. A belt 338 is trained around the pulley 336 and a separate pulley 339 driven by the power take off 318 on the tractor 44.

With this arrangement, the fan 320 draws clean air from immediately behind the tractor 44. The air supply 316 also remains stationary with the tractor 44. Consequently, the draw bar 40 can be pivoted relative to the planter unit 10 to make an angle of as much as 90° with the length of the tractor, as shown in FIG. 8. This is made possible by the fact that no shaft connection is required between the tractor and the planter unit 10 to operate the pressurized air supply 316.

To make the connection between the subassembly 290 and the draw bar 40, an adapter 340 is utilized. The adapter 340 has spaced, depending flanges 342 and 344 which captively surround the rear reinforcing bar 306. An upper plate 346 abuts the reinforcing bar 306 in a position in which a holding pin 348 can be directed through aligned bores 350 and 352 in the flanges 342 and 344 and the reinforcing bar 306, respectively, to prevent upward movement of the adapter 340. The adapter 340 has vertically spaced flanges 354 and 356 which are arranged to surround the top and bottom surface 358 and 360 of the draw bar 40. A releasable locking pin 362 can be inserted through the flange 354, the drawbar 40, and the flange 356 to form a connection which permits relative pivoting movement between the draw bar 40 and adapter 340 about a vertical axis 362.

Pressurized air is delivered by the supply 316 through an internal space 364 defined by the rigid, hollow draw bar 40. An opening 366 is provided in the top surface 358 of the draw bar 40 to establish communication with the internal space 364. A fitting 368 is mounted to the draw bar 40 around the opening 366 and releasably accepts the end 370 of a flexible conduit 372. The other conduit end 374 is connected to the outlet end 330 of the fitting 328 to permit the flow of pressurized air between the supply 316 and the space 364.

The rigid draw bar 40 forms a conduit for the pressurized air between the supply 316 and the metering mechanism 172 on the seed container 30. Another conduit 375 can be directed through the hollow space 364 within the draw bar 40 so that the draw bar 40 can convey two different fluids to two different points of use. In the illustrative embodiment, the conduit 374 extends from a hydraulic supply 376 to a control 377 for the fertilizer coulter wheel assembly 45, to selectively effect vertical movement of the assembly 45.

The wheel 16 is used to mechanically operate the metering means 172, thereby avoiding the need for separate hydraulic or electrical supplies. Thus, rotation of one of the wheels 16 causes operation of the metering mechanism 172 through a power transfer device 378. Normally, for a given rotational velocity of the wheel 16, the metering mechanism 172 is operated to deliver seed at a desired rate. Similarly the wheel 16, through the power transfer device, operates a control to release fertilizer from the containers 32 and 34 at a rate proportional to the rotational velocity of the wheel 16.

Figure 18:
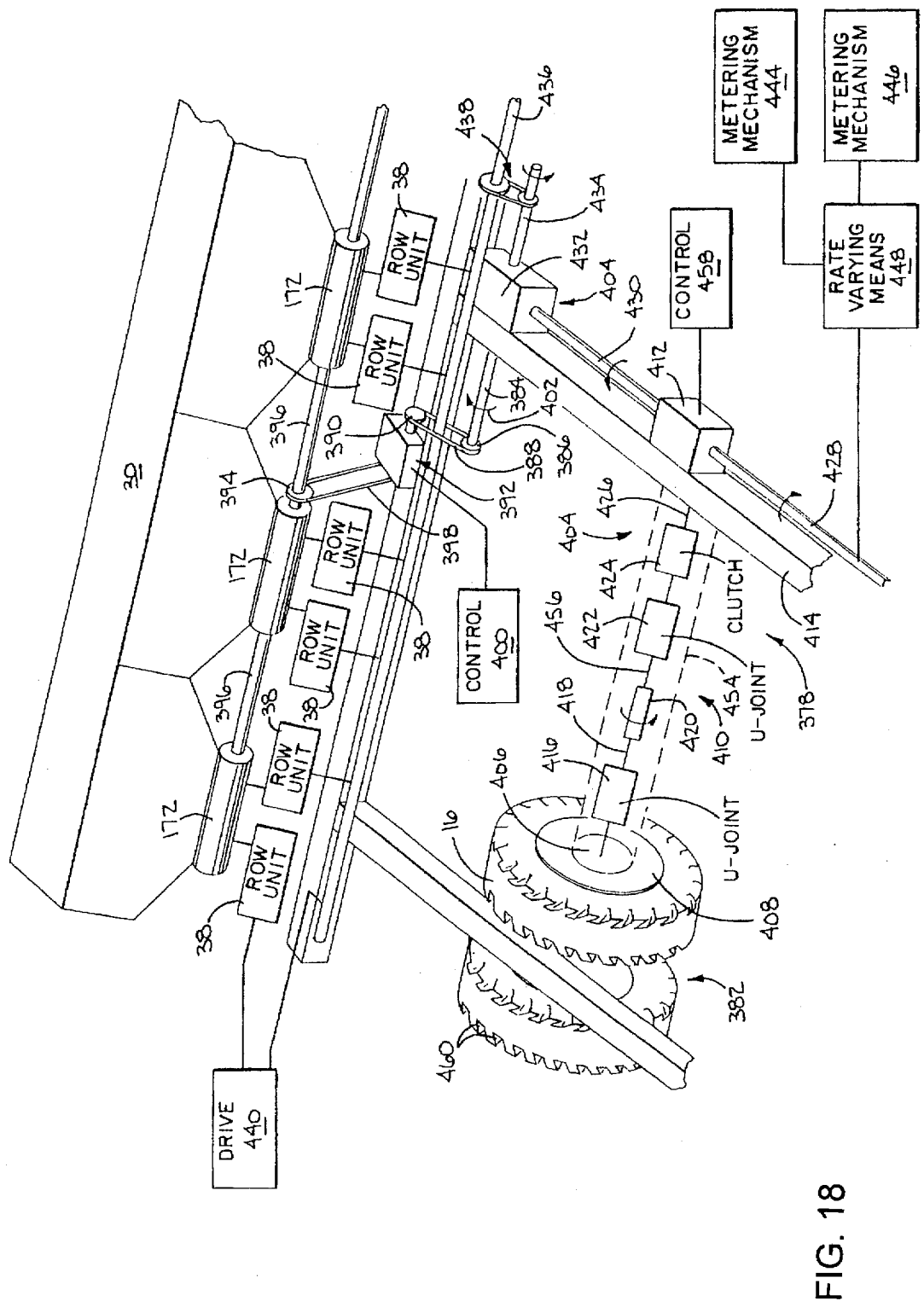
FIG. 18 is an enlarged, fragmentary, perspective of a metering system on the planter unit for controllably delivering seed and/or additive from supplies on the frame to underlying soil.

Details of the power transfer device 378 are shown in FIG. 18. The power transfer device 378 transmits a rotative force from one of the ground-engaging wheels 16 on one wheel carriage assembly 382 to a laterally extending takeoff shaft 384 carrying a sprocket 386. A chain 388 is trained around the sprocket 386 and a sprocket 390 on a speed-shifting, rate-varying mechanism 392.

A sprocket (not shown) on the speed-shifting mechanism 392 drives a sprocket 394 and a laterally extending shaft 396 through a chain 398. The shaft 396 in turn drives each of the metering mechanisms 172 on the seed container 30. Seed is delivered from each metering mechanism 172 to a pair of row units 38 for delivery into corresponding seed slots in the underlying soil The speed-shifting mechanism 392 has a conventional construction. A manual control 400 can be used to operate the speed-shifting mechanism 392 to vary the ratio of the output speed of the shaft 396 for a given input from the takeoff shaft, rotated in the direction of the arrow 402. As mentioned, the input speed is proportional to the rotational velocity of the wheel 16.

A power transmission train 404 connected between the wheel 380 and the shaft 384 is driven off a plate 406 that is bolted to a hub 408 on the wheel 380. The power transmission train 404 includes a force transmission assembly 410 connecting the plate 406 and a first right-angle gear box 412 mounted to a central frame element 414 extending in a fore and aft direction. The force transmission assembly 410 includes, consecutively from the plate 406, a first U-joint 416, telescoping shaft sections 418 and 420, a second U-joint 422, and a one-way and torque-limiting clutch 424. A shaft 426 extends laterally from the clutch 424 into the gear box 412.

The shaft 426 drives a forwardly extending shaft 428 and a rearwardly extending shaft 430 through the gear box 412. The shaft 430 drives the takeoff shaft 384 through a second right-angle gear box 432, and also drives a shaft 434 which in turn drives a laterally extending takeoff shaft 436 through a chain and sprocket assembly at 438. The previously described press wheels 170, associated with each row unit 38, are driven by the shaft 436 through a drive shown schematically at 440, for an exemplary row unit 38 on the left side of FIG. 18. The drive 440 may be of any suitable construction and, in a preferred form, is a chain and sprocket arrangement that drives a shaft 442 (FIGS. 4 and 5) on each row unit to thereby drive the press wheel 170 through the serially arranged chains 179, 180 and 182.

The forwardly extending shaft 428 on the power transfer device 378 can be used to drive a metering mechanism 444, as seen in FIG. 3, associated with the additive container 32 and/or a metering mechanism 446 associated with the container tanks 34. The power transfer device 378 can operate the metering mechanisms 444 and 446 through a speed-shifting, rate-varying mechanism 448, corresponding to the mechanism 392 previously described. Both rate-varying mechanism 392 and 448 can be operated through a central controller 446, which may be manually operable or responsive to mapping data input 450.

With this arrangement, there need not be any drive chains in the transmission train 404 between the plate 406 and shafts 384 and 434. Consequently, the performance of the power transmission train between these two points is generally unaffected by existing residue in a field. To further shield the force transmission assembly 410, a protective cylindrical sleeve 454 is placed thereover between the plate 406 and the frame element 414.

I claim:

1. An apparatus for generating a signal indicative of the hardness of subjacent soil in a field, said apparatus comprising:

a soil treating implement having a first frame;

a towing frame;

means for attaching the soil treating implement to the towing frame for movement of the soil treating implement vertically relative to the towing frame within a range;

sensing means on at least one of the first and towing frames for engaging subjacent soil and generating a signal indicative of the hardness of subjacent soil as the one of the first and towing frames moves relative to subjacent soil, wherein the sensing means includes a sensing element that rolls along subjacent soil relative to which the frame is moved, said apparatus further including means acting between the towing frame and soil treating implement for developing a variable vertical force on the soil treating implement, there being means on the force developing means responsive to the signal from the signal generating means for causing a vertical force to be developed by the force developing means on the soil treating implement.

2. The apparatus of claim 1 wherein said force developing means is a fluidized pressure system.

3. The apparatus of claim 1 which includes at least one spring urging the said treating implement downwardly, and said force developing means modulates the force of said spring.

* * * * *